3,007,769
PROCESS FOR RECOVERY OF NUCLEAR FUEL FROM USED FUEL ELEMENTS
Andrew T. McCord, Snyder, and Donald R. Spink, East Amherst, N.Y., assignors to The Carborundum Company, Niagara Falls, N.Y., a corporation of Delaware
Filed Apr. 24, 1956, Ser. No. 580,391
19 Claims. (Cl. 23—14.5)

This invention relates to a process for the recovery of nuclear fuel materials of either fissionable or fertile character from used or spent nuclear fuel elements.

Nuclear power fuel elements can be divided into innumerable types. The present invention is primarily concerned with those nuclear fuel elements of the solid type comprising a body or core of thermal neutron fissionable uranium isotopes, plutonium, either unalloyed or alloyed with zirconium, niobium or other low cross-section metals, and usually clad with a low cross-section, corrosion-resistant zirconium-based metal such as zirconium or a zirconium alloy.

Nuclear power fuel elements contain two types of nuclear fuel material, both of which are valuable and must be recovered. It is essential that the fuel element contain fissionable nuclear fuel material, such as the uranium isotopes U 233 and U 235, or plutonium Pu 239. Fuel elements also contain nuclear fuel materials that are not originally fissionable, but can be converted to fissionable material and are therefore said to be fertile or potential nuclear fuel materials. For example, U 238 is a fertile material often present in fuel elements in considerable amounts, in fact up to 99.3% of the total uranium content in the case of an unenriched element. During the course of use of the element in the power reactor the fissionable material, such as U 233 and U 235 or Pu 239 release neutrons. Some of the neutrons are trapped by the fertile but unfissionable U 238 present in the element and the U 238 eventually becomes Pu 239 which is fissionable. In the same way, thorium which is a fertile but unfissionable material absorbs neutrons to become U 233 which is fissionable and useful as a nuclear fuel material.

Fuel elements of the solid type with which the present invention is concerned deteriorate due to radiation damage long before their content of fissionable fuel is used. At the same time radioactive fission products accumulate in the fuel element. Some are gases, others are solids, each is objectionable in reducing the efficiency of the reactor as a whole and each exerts some part in the destruction or disintegration of the fuel element. Long before the nuclear fuel, or fissionable material, has been completely consumed, the elements are adjudged to be "burned out" or spent and are removed from the reactor. For essential reasons of economy it is obvious that the residual unused uranium or other nuclear fuel materials, either fertile or fissionable, contained in the element be recovered for further use.

None of the heretofore known methods for recovering fuel and fertile uranium or thorium from burned out fuel elements has been completely satisfactory. For example, one existing method for recovery of nuclear fuel material from spent elements calls for the dissolving of the entire fuel element assembly in solutions which are strongly acid, after which the various elements are separated and purified by complex and lengthy chemical procedures. Such strongly acid solutions are very difficult to handle and present serious problems of equipment corrosion. The recovery operation becomes progressively more expensive, difficult, and time consuming as one treats unclad, aluminum clad, and zirconium or zirconium alloy clad elements. According to another method, the entire fuel element assembly is melted and slagged, the slag containing the objectionable radioactive fission products. Still another method which has been used calls for the dissolution of the used element in a molten fluoride bath in the presence of hydrofluoric acid where fluorine gas is added to yield volatile uranium hexafluoride. The hexafluoride is scrubbed with molten sodium fluoride to purify it whereupon the hexafluoride is then reduced to the uranium metal.

It is an object of the present invention to provide an improved method of recovering nuclear fuel materials from used fuel elements.

It is a further object of the present invention to provide a method of recovering both the fertile and the fissionable nuclear fuel materials from used fuel elements without the use of highly acid or strongly corrosive solutions.

It is a still further object to provide a method for the efficient stripping of corrosion-resistant claddings from the cores of clad nuclear fuel elements.

It is a still further object of the present invention to provide an improved method for the processing of used fuel elements wherein the cladding and/or alloying metals of the fuel element, the unused portion of nuclear fuel material, both fertile and fissionable, and the radioactive fission by-products of the used element can be separated and the usable materials therein extracted and recovered for further use.

These and other advantages and objects accruing from the present invention will become apparent as the description proceeds.

We have discovered that a substantially neutral ammonium fluoride solution is an effective solvent for zirconium and its alloys such as Zircaloy 2 and Zircaloy 3, hafnium, uranium and titanium and that furthermore the surface of a metallic body comprising any one or more of these metals is removed in a very uniform manner irrespective of the original surface contour of the metal object being dissolved. The attack is so uniform, for example, that sheets of zirconium 0.040" thick can be reduced to sheets .001" to .002" thick±.0005" by treatment in a substantially neutral solution of ammonium fluoride for a period of 30 minutes. Solution of the metal can be effectively carried out under widely different conditions, in one case using for example, a solution of ammonium fluoride having a concentration of 500 grams per liter at room temperature (25° C.), and in another case using an ammonium fluoride solution having a concentration of 100 grams per liter at a temperature of 90° C. The pH of the ammonium fluoride solution remains fairly constant for a given concentration and temperature, and at temperatures from room temperature to around 60° C. will be between about 6 to 7 pH, whereas at higher temperatures, and especially at temperatures approaching the boiling point of the solution, will be slightly lower, i.e., about 5 to 6 pH due to the formation of a small amount of ammonium bifluoride in the solution. It can therefore be said that the present process is normally, with the possible exception noted farther on herein, carried out with the pH between 5 and 7 or slightly higher. Regardless of the specific temperature and concentration of the ammonium fluoride solution, the metal removal takes place uniformly and the dissolution rate can be predetermined with an accuracy in the neighborhood of a few ten-thousandths of an inch. On the basis of such findings, we have been able to remove a zirconium alloy cladding 0.031" thick from a nuclear fuel element without any appreciable attacking of the encased uranium alloy core material of the element by immersion of the clad fuel element in a neutral solution of ammonium fluoride and removal of the declad element from the ammonium fluoride solvent solution after a predetermined time based upon the predictable rate of solution of the zirconium alloy cladding under the temperature and concentration conditions of the ammonium fluoride bath. Removal of the zirconium alloy or other corrosion-resistant metal cladding from the fuel element leaves the core of the element containing the nuclear fuel material in a substantially exposed condition suitable for further treatment for separation and recovery of valuable constituents contained in the core for further use. The dissolved zirconium contained in the ammonium fluoride solution also can be recovered by suitable chemical processing as will be explained later.

Although the present process is described primarily as it is usually, and preferably, carried out with the use of substantially neutral or slightly acid solutions of ammonium fluoride ($NH_4F$) because of the greater ease of handling and containing such substantially neutral or mildly acid solutions, ammonium bifluoride, $NH_4HF_2$, of high acidity, can similarly be used. Example VI herein is an example of the process as carried out utilizing an ammonium bifluoride solution as the solvent.

We have further discovered that uranium and alloys of uranium and zirconium are soluble in substantially neutral solutions of ammonium fluoride with both metals going into solution. As a result, neutral solutions of ammonium fluoride can therefore not only be used effectively for the removal of the corrosion-resistant metal claddings from clad fuel elements but the same solutions can be satisfactorily used for the subsequent processing of the fuel element core to recover the unused portion of nuclear fuel material contained in the core.

After the neutral solution of ammonium fluoride has been used as a solvent medium for the disintegration or dissolution of the zirconium-uranium alloy, upon either cooling of the fluoride solution and/or the addition of ammonium fluoride to increase the concentration, mixed crystals of an ammonium fluozirconate, $(NH_4)_3ZrF_7$, and uranium fluoride are produced so that the zirconium and uranium in the solution can be removed from the mother liquor in the form of mixed crystals. Upon slurrying the resulting mixed crystals in a small volume of water, the zirconium compound is soluble and goes into solution whereas the uranium fluoride is insoluble and can be separately recovered. We have made the following rather surprising finding. When the uranium is dissolved in the ammonium fluoride solution in the presence of zirconium in the solution the uranium fluoride and ammonium fluozirconate crystals are both easily crystallized out of solution and can then be separated as explained herein. However, when the uranium fluoride is dissolved in an ammonium fluoride solution and the solution contains no zirconium the dissolved uranium fluoride resists all efforts to crystallize it out of solution. This effect of zirconium upon the behavior of the uranium fluoride is most surprising and we can offer no explanation for it.

When a fuel element has served its useful life in a reactor it contains, in addition to the original nuclear fuel material, both fertile and fissionable, and any alloying metal of the core, a quantity of newly formed nuclear fuel and an appreciable amount of radioactive fission products. Upon aging the used fuel element for a period of time to permit radioactive elements with short half-life to decay, a process which is customary, the list of remaining radioactive fission products, while still large, can be classified into groups that are similar in chemical behaviors. These are:

(1) The rare earth group.
(2) The alkaline earth group, principally barium and strontium.
(3) The alkali metals group, such as cesium.
(4) The inert gases such as krypton and xenon.
(5) The halides such as iodine.
(6) The group including zirconium.

The fuel element core also contains, either as originally present or as produced during operations as a consequence of the fission reaction, fissionable elements such as U 235 and U 233 and plutonium (Pu 239), and fertile materials such as U 238 or thorium. When the core of a used or spent fuel element is dissolved or disintegrated in a neutral solution of ammonium fluoride, these radioactive fission products and various fissionable materials form insoluble fluorides or fluoride complexes which can then be removed from the ammonium fluoride solution by filtration, centrifuging or by other suitable procedure. Iodine and the inert gases are removed as gas in a suitable ventilation system. The plutonium which is present with the radioactive fission products can be separated from the remaining fission products by slurrying the precipitate with water and a mild oxidizer and oxalic acid which converts the plutonium to a soluble oxalate which is then separated from the other materials which remain insoluble. Ammonium fluoride in substantially neutral solution is therefore an effective solvent which can be used not only for the removal of the corrosion-resistant metal cladding of a clad fuel element but it is also an effective solvent means for the treatment and separation of the various usable constituents of a spent fuel element core or the direct treatment of an unclad fuel element body.

FIGURE 1 of the drawing depicts in the form of a flow-sheet the various steps of a process in accordance with the present invention for the recovery of nuclear fuel materials and other valuable constituents from used or spent fuel elements consisting of a body or core of a uranium-zirconium alloy which has been used without a cladding or has been encased in a zirconium alloy or other corrosion-resistant metallic cladding.

Figure 1:
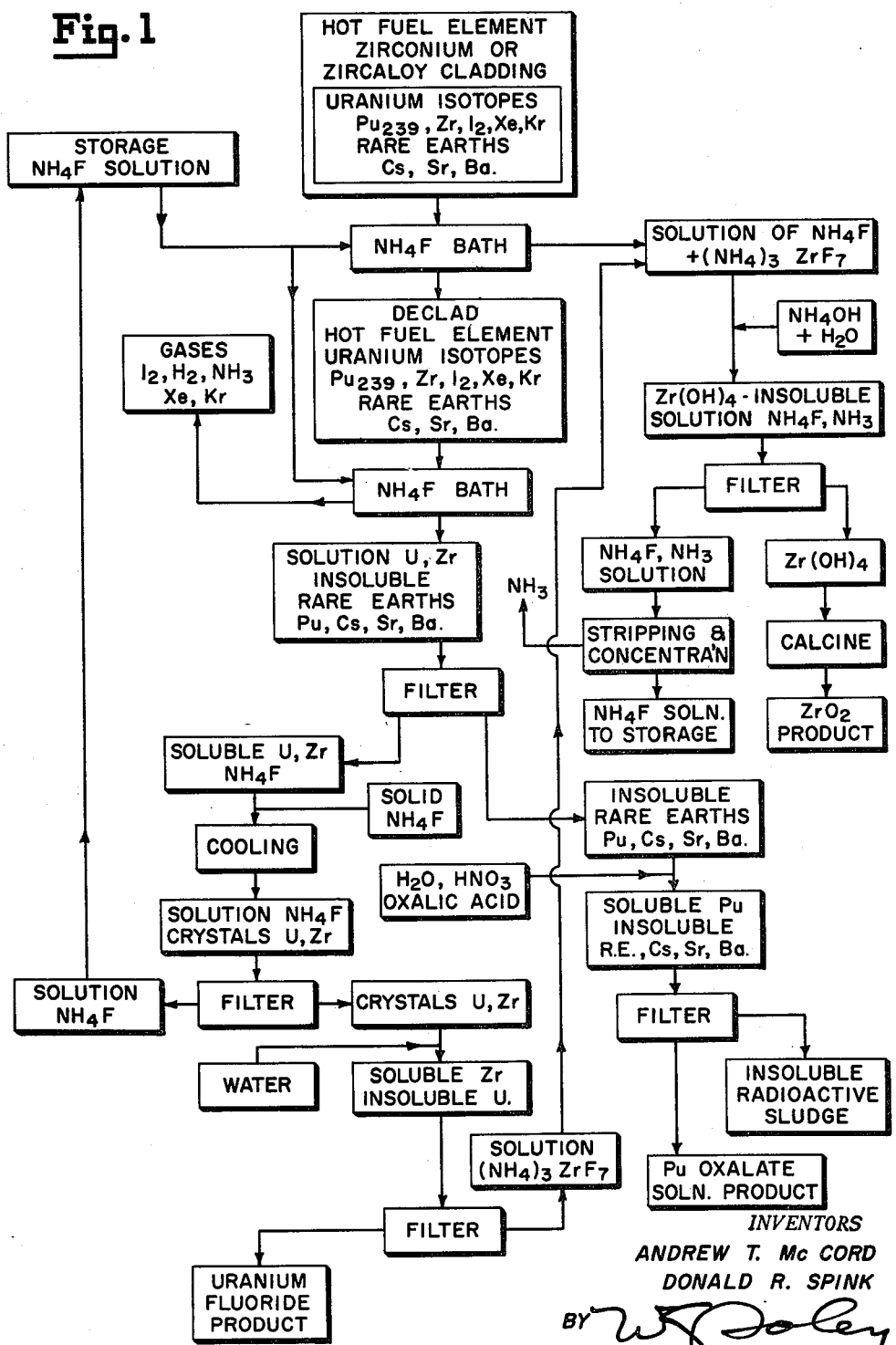

The process of treating a used or spent fuel element of the clad type in accordance with the procedure outlined in FIGURE 1 is as follows:

After a suitable period of aging to eliminate or at least minimize the content of radioactive fission products of short half-life in order to reduce as much as possible the hazards of handling and difficulties of processing, the used fuel element is immersed in a substantially neutral ammonium fluoride solution and left in the solution a sufficient period of time to remove substantially all the zirconium or zirconium alloy cladding from the element, thereby exposing the core of the element for treatment. The temperature and concentration of the neutral ammonium fluoride solution are not critical although the rate of solution of the zirconium or zironium alloy cladding is dependent upon both. The temperature can range from room temperature to in the neighborhood of the boiling point of the ammonium fluoride solution and the concentration can range from 10% to over 50%. The rate of dissolution of the zirconium cladding increases as the temperature and/or concentration of ammonium fluoride solution is increased. The rate of dissolution of the zirconium or zirconium alloy in substantially neutral ammonium fluoride solutions ranges from a very low rate of only a few tenths of a mil per hour using ammonium fluoride solutions of weak or low concentration at room temperature (25° C.) up to a dissolution of well over 1000 mils per hour using ammonium fluoride solutions of high concentration (over 40%) at an optimum temperature at or near the boiling temperature of the solution. When the cladding has been removed from the core of the fuel element it is removed for processing of the core materials. After the ammonium fluoride solution has been in use for some time and contains a substantial amount of dissolved zirconium, the zirconium can be removed from the solution by either cooling the solution to throw down the crystals of ammonium fluozirconate $(NH_4)_3ZrF_7$ which are recovered as such or the ammonium fluoride solution can be ammoniated by the addition of $NH_4OH$ and water whereupon the ammonium zirconium fluoride contained in the solution is hydrolyzed to form zirconium hydrate $Zr(OH)_4$ which is insoluble and can be removed by filtration. The ammonia is then stripped from the ammonium fluoride solution and the latter concentrated and returned for further use in the process. It is preferred to avoid ammoniating the entire ammonium fluoride solution containing the ammonium fluozirconate by first crystallizing the ammonium fluozirconate crystals out of the ammonium fluoride solution by either adding $NH_4F$ crystals or concentrated solutions to the used ammonium fluoride solution and cooling, or evaporating and cooling to increase the ammonium fluoride concentration. The ammonium fluozirconate crystals can then be dissolved in water and hydrolyzed with ammonium to produce zirconium hydrate. The zirconium hydrate is calcined to provide a usable zirconium oxide product.

Returning to the fuel element from which the zirconium cladding has been stripped, the declad fuel element is immersed in a substantially neutral ammonium fluoride solution wherein it is disintegrated by dissolution, resulting in a solution containing the dissolved uranium and zirconium constituents and an insoluble sludge consisting of the "hot" or radioactive fission products, including the rare earths, cesium, strontium and barium, and also plutonium. A number of the gaseous fission products such as xenon, krypton, iodine and the like pass off as gases. The resulting solution is filtered to remove the insolubles and the filtrate containing the soluble uranium and zirconium fluorides or fluoride complexes either cooled and/or additional ammonium fluoride added to the solution whereupon the uranium and zirconium fluorides crystallize out of solution. The insoluble fluorides or fluoride complexes of the "hot" or radioactive fission products can be removed from the ammonium fluoride solution by continuous filtration.

The exact nature of the zirconium and uranium compounds in solution is not known except that they are undoubtedly combined with fluorine to form complex ions; however, at certain ammonium fluoride, zirconium and uranium concentrations, $(NH_4)_3ZrF_7$ containing $UF_4 \cdot XNH_4F \cdot YH_2O$ (where $X+Y$ is equal to or greater than 0) crystallized from the solution as green crystals. Since uranium tetrafluoride is known to be green in color whereas all the zirconium complexes are colorless, the green color is attributed to the uranium. These crystals are separated from the ammonium fluoride solution by filtration. Upon treatment of the separated crystals with distilled water, the zirconium portion may be completely dissolved leaving behind dense, crystalline uranium tetrafluoride, $UF_4$, which is insoluble. The separated ammonium fluozirconate solution is substantially free from uranium.

The residual green crystals of uranium tetrafluoride, $UF_4$, can be converted to an oxide by any one of several methods. For example, the fluoride can be dissolved in nitric acid and a hydrous uranium oxide precipitated with ammonia. The hydrous oxide can then be ignited at 900° C. to the uranium oxide, $U_3O_8$ which is a black powder. It is considered that the separation and recovery of uranium is fairly complete in that the resulting uranium is free from zirconium and other metals.

The precipitate obtained from the ammonium fluoride solution upon dissolution of the fuel element core consists of the insoluble fluorides or fluoride complexes of plutonium, the rare earths, barium and strontium; and the complex fluorides of the alkali metals, presumed to be of the type $A_2MF_6$ where A is lithium, sodium, potassium, cesium, and rubidium and M is zirconium. The precipitate is slurried with water and a mild oxidizer added whereupon the plutonium is converted to the tetravalent state. The addition of a soluble compound containing the oxalate radical such as oxalic acid or ammonium oxalate converts the plutonium to a soluble oxalate which is then separated in the mother liquor by filtration. The plutonium because of its value as a nuclear fuel material is recovered by chemical processing in accordance with well-known procedures. The remaining insoluble radioactive sludge is ready for separate recovery or storage in underground tanks.

The following examples are set forth in order to clearly illustrate the specific ways in which the present process can be carried out for the decladding of nuclear fuel elements and the recovery and separation of the valuable constituents of the core from the undesirable radioactive fission products.

*Example I*

Figure 2:
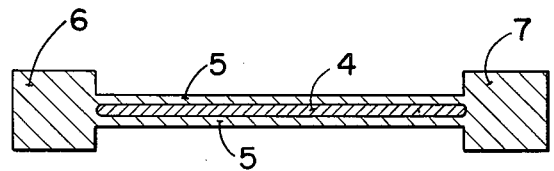
FIGURE 2 is a cross section of a clad nuclear fuel element having a central portion and two side rails, the core of the element being disposed in the central portion thereof.

A section of a nuclear fuel element such as that shown in FIGURE 2 was used. The fuel element consisted of a fuel plate 4 of a uranium-zirconium alloy encased in a cladding 5 of a zirconium alloy such as Zircaloy 2. The fuel element is also provided with side-rails 6 and 7. The core of the fuel element is 0.031″ thick and the Zircaloy 2 cladding is 0.030″ thick. The overall thickness at the side rails of the fuel element is 0.185″.

A section of a fuel plate of the above-described type was immersed in an ammonium fluoride solution of approximately 20% (200 grams per liter) concentration at 100° C., the solution having a pH of 7. The Zircaloy cladding was dissolved from all the surfaces at a uniform rate of 1 mil per minute. A coating of material, insoluble in the ammonium fluoride, but completely soluble in dilute sulfuric acid-ammonium fluoride solution was formed. This coating did not appear to affect the rate of dissolution of the Zircaloy in the ammonium fluoride solution. It appeared to be metallic and is believed to be the tin portion of the Zircaloy material; it did not adhere tightly to the specimen and could be washed off. After the cladding was removed, the section of the fuel plate had the appearance shown in FIGURE 3 of the drawing. The fins 6a and 7a constituting the remnants of the side rails were readily severable from the remaining undissolved core 4, leaving the latter ready for further processing.

*Example II*

Pieces of fuel element free from Zircaloy 2 cladding were dissolved in a hot 20% (200 grams per liter) solution of ammonium fluoride at 7 pH. Upon cooling a green crystalline material formed, and was separated. The ammonium fluoride solution was made strongly alkaline with ammonia and a voluminous precipitate resulted. This proved to be zirconium hydrate containing an estimated 0.01% or less of uranium. This indicates that the uranium was almost completely contained in the green crystals.

The green crystals were dissolved in a minimum amount of distilled water at 70° C. and the solution cooled to 25° C. Upon filtering, the green color remained on the filter; the solution was water white. The filtrate contained only zirconium, the green filter residue contained only uranium as the metal components.

We have noted that:

(1) These green uranium-bearing crystals are very slightly soluble in cold water, cold hydrofluoric acid solutions and cold ammonium fluoride solutions.
(2) They are easily oxidized by nitric acid and yield a yellow solution.
(3) Upon adding excess ammonia to the nitric acid solution, a canary yellow uranium oxide is precipitated.
(4) The yellow oxide, when separated by filtration is zirconium-free.
(5) Upon calcination at 900° C., black $U_3O_8$ is produced.

*Example III*

A section of fuel plate of the type shown in FIGURE 2

Figure 3:
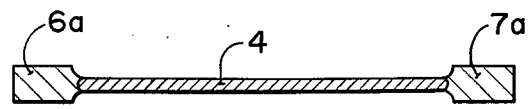
FIGURE 3 is a section of the same element after dissolution of the cladding.

1½" long and weighing 44.1096 grams was immersed in a 15% (150 grams per liter) substantially neutral solution of ammonium fluoride at 103° C.; after 100 minutes in the solution, 16.5752 grams of metal remained. The rate of solution was 30 mils in one hundred minutes or 18 mils per hour. 58 mils were removed in the center section or 29 mils per side, and 62 mils from the side rails or 31 mils per side. The dissolution of metal was extremely uniform over the entire surface; the treated specimen consisting of the core of nuclear fuel material completely free from the Zircaloy cladding with the side rails attached is shown in FIGURE 3 of the drawing.

*Example IV*

A segment of fuel plate similar to that used in Example III and weighing 38.0683 grams was immersed in a substantially neutral solution of ammonium fluoride of 20% (200 grams per liter) concentration for one hour at the boiling point (about 105° C.). The resulting finned but decladded plate weighed 9.69 grams, showing a removal of 31 mils from all surfaces. The surface area of the specimen was calculated to be 8.42 sq. in. The corrosion rate was calculated to be 31 mils per hour.

*Example V*

A segment of fuel plate similar to that used in Examples III and IV was immersed in a hot concentrated solution of ammonium fluoride. The concentration was in the range of approximately 50% (500 grams per liter), the pH was approximately 5.0 and the temperature of the solution approximately 150° C. Within six minutes, the fuel plate had completely dissolved. This test was repeated with similar results.

*Example VI*

A segment of fuel plate similar to that used in Example V and weighing 44.5431 grams was immersed in a near boiling solution of ammonium bifluoride. The temperature of the solution was maintained at 180° C. After two minutes in this solution, the thickness of the specimen was reduced from 0.091" to 0.027", corresponding to a loss of approximately 16 mils per minute on each surface. The weight of the specimen after treatment was 14.4147 grams. This fast etch was extremely uniform in that the thickness of the etched plate varied less than 1 mil.

While we have particularly described the invention as it has been applied to the treatment of fuel elements embodying a zirconium or zirconium alloy cladding, the invention is similarly applicable to the processing of nuclear fuel elements of the non-clad solid type. It is also applicable to fuel elements embodying plutonium as the nuclear fuel material. It is also obvious that the process is equally effective with all shapes and sizes of fuel elements, and not limited to any specific form such as the plate form shown in FIGURES 2 and 3 of the drawing.

Having described the invention in detail it is desired to claim:

1. In a process for recovering the core of a clad nuclear fuel element of the solid type by the removal of the cladding therefrom, wherein the nuclear fuel element is of the type having a metallic core of nuclear fuel material consisting of a thermal neutron fissionable material that is selected from the group consisting of the thermal neutron fissionable uranium isotopes, plutonium, and mixtures thereof, and a metallic material selected from the group consisting of zirconium and alloys consisting preponderantly of zirconium, and disposed about the core, a cladding of corrosion-resistant zirconium-based metal preponderantly of zirconium, the steps comprising immersing the clad element in a substantially neutral solution of ammonium fluoride, dissolving said cladding from the element in the ammonium fluoride solution, and then removing the core from the solution and thereby recovering the core free from the cladding.

2. A process according to claim 1 in which the cladding is zirconium.

3. A process according to claim 1 in which the cladding is a zirconium alloy preponderantly of zirconium.

4. A process according to claim 1 in which the concentration of the ammonium fluoride solution is from 10% to 50%.

5. A process according to claim 1 in which the ammonium fluoride solution is maintained at a temperature between 25° C. and the boiling point of the solution.

6. In a process for the recovery of the valuable components of the core of a nuclear fuel element of the solid type having a metallic core of nuclear fuel material consisting of a thermal neutron fissionable material selected from the group consisting of the thermal neutron fissionable uranium isotopes, plutonium, and mixtures thereof, and a metallic material selected from the group consisting of zirconium and alloys consisting preponderantly of zirconium, and encasing said core, a cladding of corrosion-resistant zirconium-based metal preponderantly of zirconium, the steps comprising stripping the cladding from said element to expose the core, immersing the exposed core in a substantially neutral solution of ammonium fluoride, and disintegrating the core by dissolution therein.

7. A process for the recovery of the valuable components of a nuclear fuel element of the solid type having a metallic core of nuclear fuel material consisting of a thermal neutron fissionable material selected from the group consisting of the thermal neutron fissionable uranium isotopes, plutonium, and mixtures thereof, and a metallic material selected from the group consisting of zirconium and alloys consisting preponderantly of zirconium, and, encasing said core, a cladding of corrosion-resistant zirconium-based metal preponderantly of zirconium, the steps comprising immersing said element in a substantially neutral solution of ammonium fluoride, disintegrating said element therein by dissolution of the soluble metallic constituents thereof in the solution, and then separating from the remaining constituents of the solution the thermal neutron fissionable material values.

8. A process according to claim 7 in which the concentration of the ammonium fluoride solution is from 10% to 50% during said disintegrating step.

9. A process according to claim 7 in which the ammonium fluoride solution is maintained between 25° C. and the boiling point of said solution during said disintegrating step.

10. A process for the recovery of the valuable components of a nuclear fuel element of the solid type having a metallic core of nuclear fuel material consisting of a thermal neutron fissionable material selected from the group consisting of the thermal neutron fissionable uranium isotopes, plutonium, and mixtures thereof, and a metallic material selected from the group consisting of zirconium and alloys consisting preponderantly of zirconium, and, encasing said core, a cladding of corrosion-resistant zirconium-based metal preponderantly of zirconium, the steps comprising immersing the clad element in a substantially neutral solution of ammonium fluoride, dissolving said cladding from the element in said ammonium fluoride solution to expose the core, removing the exposed core undissolved from the ammonium fluoride solution containing the dissolved cladding, immersing said core in another substantially neutral solution of ammonium fluoride and disintegrating said core therein by dissolution.

11. A process according to claim 10 in which the cladding metal is a zirconium alloy preponderantly of zirconium.

12. A process according to claim 10 in which the cladding metal is zirconium.

13. A process according to claim 10 in which the concentration of the ammonium fluoride solution is from 10% to 50%.

14. A process according to claim 10 in which the ammonium fluoride solution is maintained between 25° C. and the boiling point of the solution.

15. In a process for recovering the valuable components of a used nuclear fuel element of the solid type having a metallic core of nuclear fuel material consisting of a thermal neutron fissionable material selected from the group consisting of the thermal neutron fissionable uranium isotopes, plutonium, and mixtures thereof, radioactive fission products, and a metallic material selected from the group consisting of zirconium and alloys consisting preponderantly of zirconium, and, encasing said core, a cladding of corrosion-resistant zirconium-based metal preponderantly of zirconium, in which process the core of the element is disintegrated by solvent action in a substantially neutral solution of ammonium fluoride to obtain insolubles including the plutonium values and a solution including fluorides of zirconium and uranium, the method for separating the uranium and plutonium values from the said insolubles and the resulting fluoride solution by steps comprising: separating said insolubles from the fluoride solution, then adding ammonium fluoride to the solution and cooling the solution to precipitate contained fluorides of zirconium and uranium, separating the precipitated fluorides of zirconium and uranium from the solution, adding water to the separated mixture of zirconium and uranium fluorides to dissolve the zirconium fluoride, separating the undissolved uranium fluoride from the resulting solution, slurrying the aforesaid insolubles from the initial solution separation with water in the presence of an oxidizing agent to oxidize the plutonium constituent thereof, then adding thereto an oxalate compound to form a soluble plutonium oxalate, and separating the remaining insolubles therefrom to recover the plutonium.

16. In a process for recovering the valuable components of a used nuclear fuel element of the solid type having a metallic core of nuclear fuel material consisting of a thermal neutron fissionable material selected from the group consisting of the thermal neutron fissionable uranium isotopes, plutonium, and mixtures thereof, radioactive fission products, and a metallic material selected from the group consisting of zirconium and alloys consisting preponderantly of zirconium and, encasing said core, a cladding of corrosion-resistant zirconium-based metal preponderantly of zirconium, in which process the metallic core of the element is disintegrated by solvent action in a substantially neutral solution of ammonium fluoride to provide a resulting solution of soluble fluorides including zirconium fluoride and uranium fluoride and to cause the precipitation of insolubles including fluorides and fluoride complexes of radioactive fission products and plutonium, the steps comprising treating the insoluble fluoride mixture in an aqueous slurry with an oxidizing agent to oxidize the plutonium constituent, adding an oxalate compound to the oxidized solution to convert the plutonium constituent to a soluble plutonium oxalate, and separating the solution from the insoluble radioactive residue.

17. In the process of recovering the valuable components of the metallic core of a nuclear fuel element of the solid type in which said core consists essentially of a thermal neutron fissionable material selected from the group consisting of the thermal neutron fissionable uranium isotopes, plutonium, and mixtures thereof, and a metallic material selected from the group consisting of zirconium and alloys consisting preponderantly of zirconium, and in which the metallic core of the element is disintegrated by solvent action in a substantially neutral solution of ammonium fluoride to obtain an insoluble precipitate and a solution including the fluorides of zirconium and uranium, the steps comprising recovering mixed crystals including zirconium and uranium fluorides from said last-named solution, slurrying said mixed crystals in water to dissolve the zirconium-containing portion thereof, and separating the insoluble uranium-containing portion thereof.

18. In the process of recovering zirconium from the cladding of a nuclear fuel element of the solid type having a metallic core of nuclear fuel material consisting of a thermal neutron fissionable material selected from the group consisting of the thermal neutron fissionable uranium isotopes, plutonium, and mixtures thereof, and a metallic material selected from the group consisting of zirconium and alloys consisting preponderantly of zirconium, and, encasing said core, a cladding of corrosion-resistant zirconium-based metal preponderantly of zirconium, and in which process the cladding is dissolved from the element in a substantially neutral solution of ammonium fluoride, the method of recovering the zirconium values from the resulting solution which comprises adding sufficient ammonia to the solution to raise the pH of the solution to 8 to 9, thereby forming insoluble zirconium hydrate, and separating the insoluble zirconium hydrate from the solution.

19. In the process of recovering zirconium from the cladding of a nuclear fuel element of the solid type having a metallic core of nuclear fuel material consisting of a thermal neutron fissionable material selected from the group consisting of the thermal neutron fissionable uranium isotopes, plutonium, and mixtures thereof, together with a metallic material selected from the group consisting of zirconium and alloys consisting preponderantly of zirconium, said core being encased in a cladding of corrosion-resistant zirconium-based metal preponderantly of zirconium, and in which process the cladding is dissolved from the element in a substantially neutral solution of ammonium fluoride, the method of recovering the zirconium values from the resulting solution and of regenerating the solution for further use, comprising adding sufficient ammonia to said resulting solution to raise the pH of the solution to 8 to 9, thereby forming insoluble zirconium hydrate, separating the insoluble zirconium hydrate from the solution, stripping the ammonia from the solution, and then concentrating the stripped solution for reuse in the process.

References Cited in the file of this patent

UNITED STATES PATENTS 2,921,836 McCord et al. _____ Jan. 19, 1960

OTHER REFERENCES

Straumanis et al.: Zeitschrift für anorg. u. allgem, chemie, vol. 278, pp. 33–41 (1955).

Long: Nuclear Science Abstracts, vol. 5, p. 697 (abstract 4400), 1951.

Katz et al.: The Chemistry of Uranium, p. 168 (1951), Pub. by McGraw-Hill, N.Y.

Smyth: A General Account of the Development of Methods of Using Atomic Energy for Military Purposes Under the Auspices of the United States Government, p. 103 (1945). Superintendent of Documents, Washington 25, D.C.

Mellor: "Comprehensive Treatise on Inorganic and Theoretical Chemistry," vol. 2, page 520 (1922).

UNITED STATES PATENT OFFICE
CERTIFICATE OF CORRECTION

Patent No. 3,007,769            November 7, 1961

Andrew T. McCord et al.

It is hereby certified that error appears in the above numbered patent requiring correction and that the said Letters Patent should read as corrected below.

Column 7, line 70, after "solu-" insert -- tion of ammonium fluoride, dissolving the cladding of the --.

Signed and sealed this 24th day of April 1962.

(SEAL)
Attest:

ESTON G. JOHNSON            DAVID L. LADD
Attesting Officer            Commissioner of Patents